(No Model.)

J. N. WARD.
ROLLER SKATE.

No. 321,064. Patented June 30, 1885.

Witnesses.
William G. Needham
Fred F. Ross

Inventor.
Jasper N. Ward
by W. J. Dennis
Attorney

United States Patent Office.

JASPER N. WARD, OF RICHMOND, INDIANA.

ROLLER-SKATE.

SPECIFICATION forming part of Letters Patent No. 321,064, dated June 30, 1885.

Application filed February 6, 1885. (No model.)

*To all whom it may concern:*

Be it known that I, JASPER N. WARD, a citizen of the United States, residing at Richmond, in the county of Wayne and State of Indiana, have invented certain new and useful Improvements in Roller-Skates; and I do hereby declare the following to be a full, clear, and exact description of the invention, such as will enable others skilled in the art to which it appertains to make and use the same.

My invention relates to that class of roller-skates used in rink and parlor skating.

My invention consists in a novel method of producing and regulating the pressure upon the rubber cushion of a roller-skate, and in the construction and arrangement of the working parts of the same.

Figure 1:
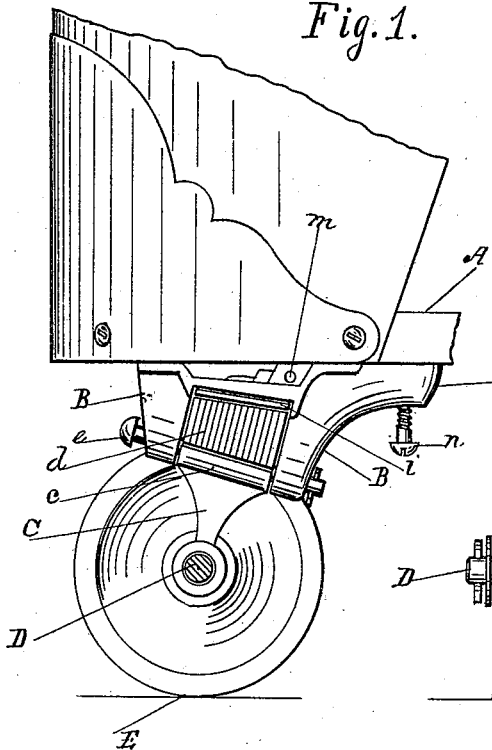
Figure 2:
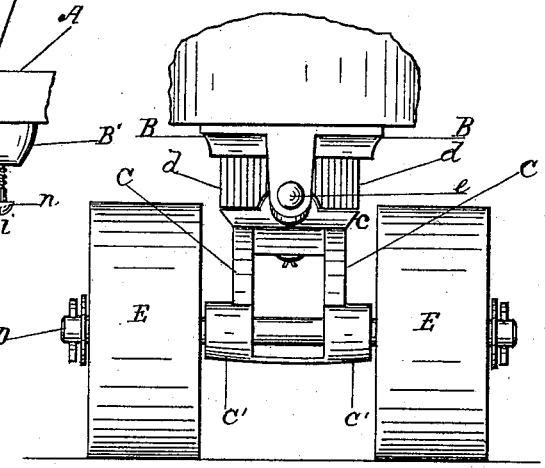
Figure 3:
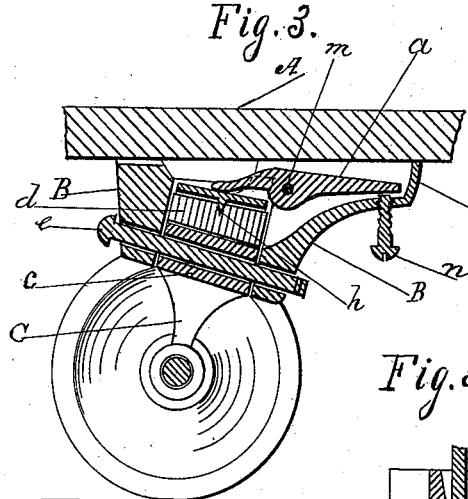
Figure 4:
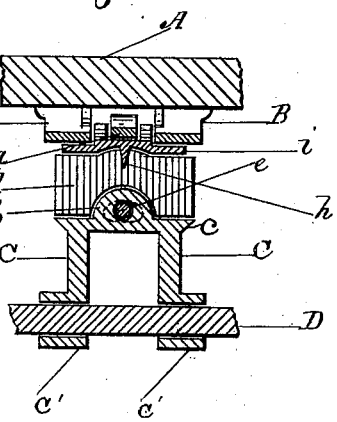
Figure 5:
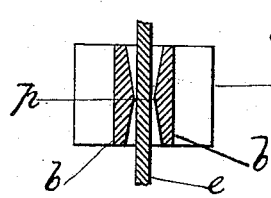

In the drawings, Figure 1 is a side elevation of the rear truck of my improved skate. Fig. 2 is a rear elevation of the same. Fig. 3 is a longitudinal vertical section of the same. Fig. 4 is a transverse vertical section of the same. Fig. 5 is a horizontal section of the top of the truck-frame, showing the axis-pin in position.

In Fig. 1, A represents the foot-piece of the common form; B B, the hanger-frame; C, the truck-frame; D, the axle; E, the wheels. $e$ is an axis-pin. $c$ is the top plate of the truck-frame, which has a plane surface, and is provided with a semicircular projection, $b$, Fig. 4, at right angles to the axle D.

$d$ is a cube-formed rubber cushion, which rests upon the surface of the plate $c$ of the truck-frame, having a semicircular depression in its lower or bottom surface to fit upon and correspond with the projection $b$ of the bed of the truck-frame.

The hanger-frame is provided with pendent arms B B, which extend down nearly in a vertical line and terminate in rounded ends, which are provided with holes to admit of an axis-pin, $e$. The forward end of the hanger-frame B' is extended under the foot-piece, and is made hollow, as shown in Fig. 3, to admit a lever, $a$, pivoted at $m$ in the sides of the hanger-frame B'. A temper-screw, $n$, having its thread in the forward end of the hanger-frame B', has its point in contact with the forward end of the lever $a$, and as it is turned up depresses the opposite end of the lever $a$, which rests upon and operates a pressure-plate, $i$, placed upon the top of a rubber cushion, $d$, so that the degree of pressure upon the rubber cushion is regulated by the action of the temper screw $n$. The rubber cushion $d$ is supported by the top plate, $c$, of the truck-frame and its longitudinal semicircular projection $b$, through which the axis-pin $e$ is inserted, and upon which the foot-piece and hanger-frame are permitted an oscillating motion laterally. The semicircular projection $b$ of the truck-frame top $c$ is flattened on top, leaving an opening which exposes the axis-pin $e$, as seen in Fig. 5, and the sides of the projection $b$ adjoining the axis-pin are cut away in angle from the center to the outer edge, leaving points $p$ on the inside of the opening which receives the axis-pin, at which points the projection and the axis-pin are in contact, and by which the hanger-frame and axis-pin are permitted a lateral movement in the arc of a circle at the front and rear ends on the top plate, $c$, the center of the movement being at the points $p$, Fig. 5. This arrangement allows the foot-piece and hanger-frame to swing or swivel on the truck to a limited extent, which is required in deflecting the line of motion of the trucks to produce curvilinear motion of the skate.

Having thus fully described my said invention, what I claim as new, and desire to secure by Letters Patent, is—

In a roller-skate, the hanger-frame B B, provided with a hollow extension, B', combined with a lever, $a$, temper-screw $n$, pressure-plate $h$, and rubber cushion $d$, substantially in the manner and for the purpose herein set forth.

In testimony whereof I affix my signature in presence of two witnesses.

JASPER N. WARD.

Witnesses:
W. T. DENNIS,
RICHARD A. JACKSON.